May 10, 1960 R. A. RAMEY, JR 2,936,422

MAGNETIC AMPLIFIER CONTROL CIRCUIT

Original Filed July 20, 1951

INVENTOR
ROBERT A. RAMEY, JR.

BY W R Maltby
Richard C Reed
ATTORNEYS 2,936,422

MAGNETIC AMPLIFIER CONTROL CIRCUIT

Robert A. Ramey, Jr., Library, Pa.

Original application July 20, 1951, Serial No. 237,813, now Patent No. 2,783,315, dated February 26, 1957. Divided and this application April 18, 1956, Serial No. 579,123

5 Claims. (Cl. 330—8)

(Granted under Title 35, U.S. Code (1952), sec. 266)

The invention described herein may be manufactured and used by or for the Government of the United States of America for governmental purposes without the payment of any royalties thereon or therefor.

This is a division of my copending application Serial No. 237,813, filed July 20, 1951, now U.S. Patent 2,783,315, issued February 26, 1957 for a Magnetic Amplifier Control Circuit.

This invention relates in general to magnetic amplifiers and in particular to magnetic amplifier circuits which provide high gain and rapid time response with a substantially linear output characteristic.

It is, therefore, an object of the present invention to provide a new and improved magnetic amplifier having a rapid time response with high power gain.

Another object of the present invention is to provide a new and improved magnetic amplifier exhibiting a linear output characteristic substantially independent of variations in the line voltage of the energy source from which the output is derived.

A further object is to provide a magnetic amplifier having a relatively high power output for a given transformer size.

Still another object is to obtain a new and improved magnetic amplifier from conventional components arranged in a simple design.

Further objects of the present invention will become apparent from the following detailed description when taken in conjunction with the drawings in which.

Figure 3:
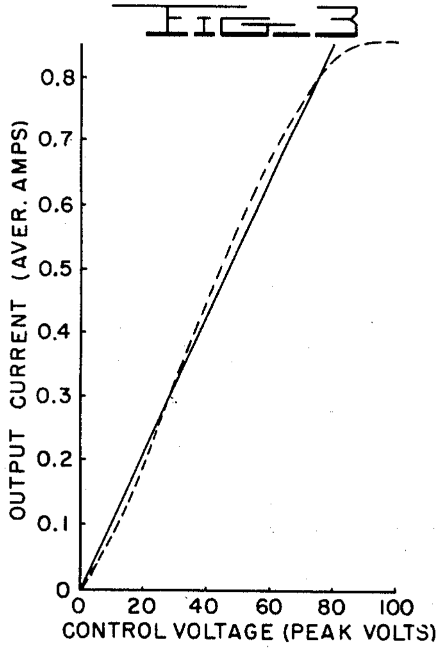
Fig. 3 is a control voltage V output current graph of the magnetic amplifier shown in Fig. 2.

In my copending application Serial No. 237,814, filed July 20, 1951, now Patent No. 2,719,885, Oct. 4, 1955, a series magnetic amplifier circuit is disclosed wherein the control voltage source is not depended upon for supplying the power for the amplifier control as is general in conventional magnetic amplifier circuits. It was further shown that the energy required for the amplifier cores is supplied entirely from the alternating current power source. The basis of the aforementioned co-pending application, as well as the present invention, is predicated on the theory that the magnetic amplifier is a voltage-sensitive device contra to the commonly presented theories relating to prior magnetic amplifiers as being current sensitive devices.

More specifically problems relating to magnetic amplifiers are approached with a realistic evaluation of the constraints imposed by ferromagnetic materials upon the magnetic amplifier operation.

One of the primary assumptions used in the analysis set forth in my copending application is that the magnetization characteristic of the core is of the same rectangular loop type as Deltamax, Orthinol, etc., with relatively complete saturation at a very low value of magnetomotive force. With such loop characteristics as well as with the more conventional magnetization characteristics it is considered that the level of magnetization of a magnetic material in its unsaturated state is not uniquely determined by the magnetomotive force applied to the windings surrounding the core of magnetic material. The loop character of the magnetization characteristics of important ferromagnetic materials destroys any single-valued dependence between flux and ampere turns and makes this dependence almost indeterminate.

It is suggested, however, that the time integral of reactive voltage across a winding of a magnetic amplifier core can be utilized in determining uniquely the magnetization level. In other words the control or independent variable is in the nature of a voltage, rather than the control circuit current which is a variable dependent on the circuit configuration, parameter characteristics, auxiliary circuitry, control variable, etc. With the magnetization loop characteristics known, the magnetization level of the core can be determined from this equation $$e=-N\left(\frac{d\theta}{dt}\right)$$

or, where the turns $N=1$, $\theta=-\int edt$ volt-seconds. Considering the double-core series amplifier of my copending application voltage is applied so as to change the magnetization level in accordance with the above equations. Thus, in the first phase of amplifier operation one of the cores deviates from saturation while the other core proceeds to saturation in the magnetization or nonconducting period, then saturates and allows load current to pass through the associated winding. That portion of the first phase of operation in which load current flows is hereinafter termed the conducting period. During the second phase of operation the magnetization of the cores are reversed from that of the first phase. It will be understood that the first and second phases of operation are usually the first and second half cycles of applied load voltage. Also, since the windings associated with the cores are connected in series, output load current flows through both windings during at least a portion of each phase, excepting, of course, when the control voltage is set at no output.

Results obtained from embodiments constructed in accordance with the magnetic amplifier of my copending application show that a time response of the order of one-half cycle of applied voltage with high power gain may be obtained.

However, the series magnetic amplifier has several disadvantages inherent in its operation of which one is the non-linear output current vs. control voltage characteristic. In addition full use of the transformer capabilities are not attained since the A.-C. source must supply the power losses associated with the control circuit resistance. These disadvantages result mainly from the fact that a change in the magnetic flux level of each core occurs during times when full output current flows in the transformer windings. The changing flux level causes a voltage to appear across the winding associated with one of the cores while the other core is saturated and thus permitting conduction. This voltage subtracts directly from that voltage which is available for application to the load impedance.

An improvement over the practical operability of the series magnetic amplifier circuit of the aforementioned copending application may be had by incorporating self-magnetizing features into circuitry which does not require a change of magnetization in a conducting transformer. This is accomplished by applying an alternating-current voltage to the primary winding of a particular transformer only during the first phase, or more usually, during the first half-cycle of the A.-C. voltage cycle, to thereby cause the associated core to proceed to saturation. During the second phase of operation the magnetization level of the core is reset by applying a second voltage to the secondary winding, the nature of the second voltage to be discussed hereinafter. In addition the windings are arranged in the amplifier circuit so that the windings associated with one core are to carry load current only during a single phase of operation in the application of the present invention to either single or multiple transformer embodiments.

Figure 1:
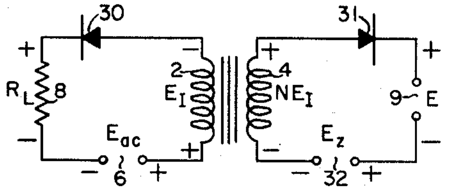
Fig. 1 is a schematic diagram of a half-wave magnetic amplifier of the present invention.

A circuit embracing the principles of the present invention is shown in Fig. 1. The primary or load circuit includes transformer winding 2 to which an alternating-voltage source, $E_{ac}$ is to be applied from terminals 6. A suitable load element 8, shown as a resistor, is provided in series with winding 2 and with element 30 which is shown as a rectifier, but it being understood that any means of limiting the application of $E_{ac}$ to winding 2 to alternate half-cycle will suffice. In the secondary or control circuit a series circuit is shown which includes the secondary winding 4, a magnetizing A.-C. voltage source $E_z$ connected to terminals 32, a D.-C. control voltage $E_c$ connected to terminals 9 and element 31 shown as a rectifier. Element 31 may be any parameter which allows the application of magnetizing voltage $E_z$ to winding 4 only during alternate half-cycles and is to be arranged in the circuit so as to prevent current flow from the D.-C. control voltage $E_c$.

In operation of the magnetic amplifier of Fig. 1 the changing of the flux level is eliminated in a core the windings of which are carrying output current by allowing that transformer winding to conduct only during alternate half-cycles and to set the magnetization level of the core during the other half-cycles. To accomplish this, the A.-C. supply voltage $E_{ac}$ at terminal 6 is applied to transformer primary winding only during positive half-cycles; during negative half-cycles the element 30 blocks the A.-C. voltage from the transformer winding. In the transformer secondary, or control circuit, element 31 is placed in series opposition to the control voltage $E_c$ at terminal 9 which is in series with the magnetizing voltage $E_z$ at terminals 32.

During positive half-cycles of $E_{ac}$ the magnetizing voltage $E_z$ tends to prevent flow of current through the control circuit winding 4 due to voltage ($NE_I$) transformed from the primary circuit into the control winding 4 and during negative half-cycles of $E_{ac}$, $E_z$ accomplishes the appropriate magnetization of the transformer core. A consideration of the optimum requisites of $E_z$ indicates that this voltage can be equal, theoretically, to $NE_{ac}$ in amplitude and of opposite instantaneous polarity, N being the transformer ratio. Setting $E_z$ equal to $NE_{ac}$ neglects the small voltage drops across the rectifier impedance and control winding resistance, thus, by way of compensation, $E_z$ should be of slightly greater magnitude than the theoretical value. Instantaneous polarity of the various parameters for the positive half-cycle of $E_{ac}$ are indicated in Fig. 1.

Control voltage function $E_c$ may be a direct-current voltage, a full-wave rectified A.-C. voltage of line frequency and phase with means for varying the amplitude, or an alternating-current voltage if the necessary precautions are observed.

Figure 2:
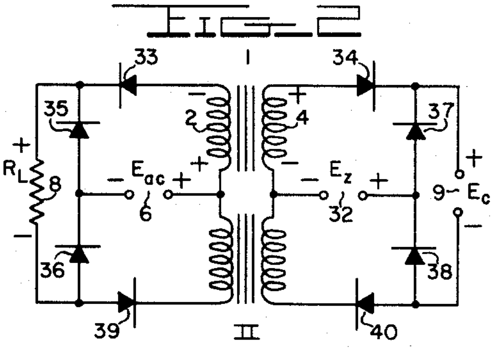
Fig. 2 is a schematic diagram of the parallel full-wave variant of the magnetic amplifier of Fig. 1.

The output current flowing in winding of the single core magnetic amplifier is of half-wave rectified form. Full-wave rectified output is obtained by appropriate paralleling of two single-core amplifiers such as shown in Fig. 2. The primary or output circuit is the same as the well known self-saturating bridge-type parallel magnetic amplifier. The transformer secondary terminals are connected in the same manner as the primary to the same bridge-type circuit with the exception that the load impedance $R_L$ is replaced by the control voltage $E_c$.

In the primary circuit the full load current flows in alternate half-cycles through the windings associated with core I and core II respectively. The existence of rectifiers 33 and 39 prevents the application of line voltage $E_{ac}$ to the core which is not permitted to conduct during any particular half-cycle.

In the secondary circuit the voltage $E_z$ is chosen to be of the same phase as the A.-C. line voltage and of magnitude $NE_{ac}$. The control voltage $E_c$ is again chosen as full wave rectified A.-C. of line frequency and phase and with variable amplitude.

During the non-conducting period (neither core is saturated) in the positive half-cycles of $E_{ac}$, with instantaneous polarities as shown in Fig. 2, the active portion of the load circuit includes the voltage source $E_{ac}$, load winding 2 of core I, rectifier 33, load $R_L$ and rectifier 36. As core I is unsaturated, substantially all of the voltage $E_{ac}$ will appear across winding 2 as $E_I$ or $$E_{ac}=E_I \quad (1)$$

In the control circuit the active circuit path includes magnetizing voltage $E_z$, rectifier 37, control voltage $E_c$ in opposition to $E_z$, rectifier 40 and the control winding of core II. The difference voltage $(E_z-E_c)$ is applied to the control winding of core II as $E_{II}'$, or, $$E_z-E_c=E_{II}' \quad (2)$$

Analogous to Equations 1 and 2, the following equations hold during the non-conducting period in the negative half-cycles of $E_{ac}$:

$$E_{ac}=E_{II}$$
$$E_z-E_c=E_I'$$

Either core when saturated has substantially zero reactive volts across the corresponding control or primary winding. Therefore, during the period of conduction in the positive half-cycles the voltage $E_{ac}$ appears across load circuit resistance $R_L$, current flowing in the circuit described above. This is expressed as:

$$E_{ac}=I_LR_L \quad (3)$$

In the control circuit Equation 2 still obtains:

$$E_z-E_c=E_{II}'$$

Similarly, during negative half-cycles:

$$E_{ac}=I_LR_L$$
$$-E_z-E_c=E_I' \quad (4)$$

This may be summarized as follows:

Either core preceding to saturation will have $$|E_I|=|E_{II}|=|E_{ac}| \quad (5)$$

across its load winding in the appropriate direction.

Either core deviating from its saturated state will have in both the conducting and non-conducting periods:

$$|E_I'|=|E_{II}'|=|E_z|-|E_c|$$

across its control winding, or $$|E_I|=|E_{II}|=|E_{ac}|-\left|\frac{E_c}{N}\right| \quad (6)$$

across its load winding in the appropriate direction.

During conducting periods the output current will be:

$$I_L=\frac{E_{ac}}{R_L} \quad (7)$$

A solution of the above equations for the phase angle at which conduction occurs may be easily obtained. This gives:

$$\cos\theta_n=\frac{2E_c}{E_z}-1 = \frac{2E_c}{NE_{ac}}-1 \quad (n \ngtr 1) \quad (8)$$

This means the phase angle of conduction for any *n*th half-cycle is dependent entirely upon the control voltage of the previous half-cycle. In other words the time for full response is a half-cycle of A.-C. voltage no matter what the other parameters of the circuit may be.

The average output current may be expressed as:

$$I_L(\text{ave.}) = \frac{1}{\pi}\frac{E_{ac}}{R_L}(1+\cos\theta_n)$$

or substituting from Equation 8;

$$I_L(\text{ave.}) = \frac{E_c(\text{ave.})}{NR_L} \quad (9)$$

From this it is seen that the average output current is directly proportional to the average control voltage. Further, this output magnitude is independent of the A.-C. supply voltage. Changes in the line voltage will not effect these relationships so long as the output current is below the saturation value for the amplifier set-up.

A parallel magnetic amplifier substantially as shown in Fig. 2 was assembled and tested. The resulting transfer characteristic is shown in Fig. 3 by the dotted line, along with the calculated "ideal" characteristic shown by the solid line. The results confirm the relationship predicted both in character and magnitude.

The component of $R_L$, due to the rectifier impedance, is a variable the average value of which was determined experimentally from voltage measurement at one-half of maximum output current. The minor deviations of the experimental curve from that predicted can be explained to a great extent, by this choice of constant rectifier impedance.

The output current's independency of line voltage was also checked experimentally. With the control voltage set a constant value to give one-fourth maximum output current the line voltage was reduced to 50% of nominal value with less than 10% change in output average current.

Time of response measurements for the experimental amplifier show that output current reaches steady-state condition one-half cycle after application or removal of control voltage.

At all times during amplifier operation of the circuit of Fig. 2 one of the transformer cores is being caused to deviate from its saturated condition because of the voltage relations existing in the control circuit. If the magnetization loops were vertical, the cores perfectly matched and the rectifiers ideal, the current flow in the control circuit would be a D.-C. value corresponding to one-half the width of the magnetization loop. This D.-C. control current would flow through the control source in the direction opposite to the control voltage, i.e., the "control power" must be absorbed by the control source. If, however, a constant current of the same magnitude were drawn from the control source the net current could be made ideally zero and consequently the "input power" would be zero allowing amplifier "gain" to be infinite.

Figure 4:
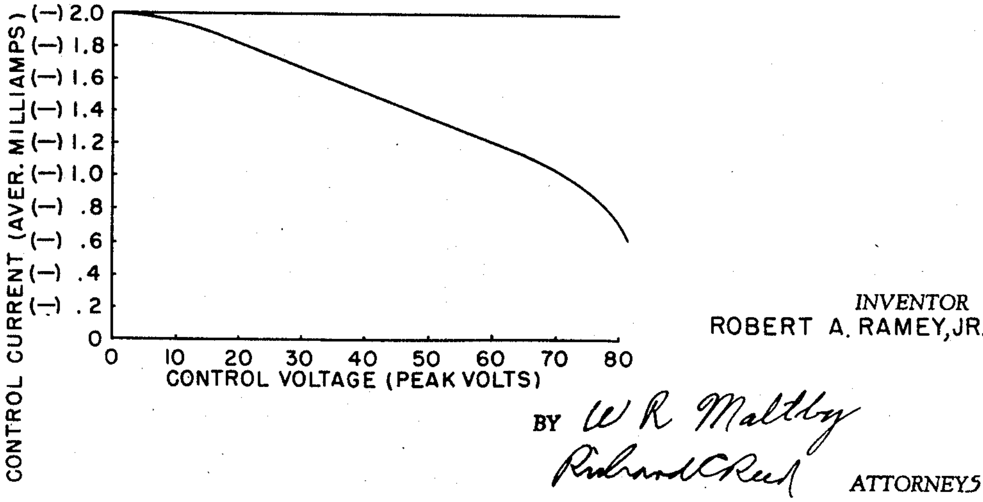
Fig. 4 is a control voltage V control current graph of the magnetic amplifier shown in Fig. 2.

The control current for the parallel circuit of Fig. 2 is shown in Figure 4 along with the calculated "ideal" characteristic. Rectifier leakage in the output circuit and "non-ideal" cores are easily seen to be principal causes for the decreases in control current as control voltage increases. It has been experimentally determined that the major difficulty arises from the rectifiers.

It has been experimentally determined that "gains" of more than a thousand can be obtained at 60 cycles per second (with 100% response within a cycle) using materials now abundantly available commercially and without compensating for control current. With care in selections of core materials and rectifiers, "gains" of the order of 10,000 at 60 cycles per second are possible. The response time will remain less than one cycle in comparison with commercially available magnetic amplifiers which, when attempt is made to approach a one-cycle response time, exhibit power gains in the range of 20 to 50. Operation at higher frequencies would give increasingly better performance of the circuits of the present invention.

Elimination of the necessity for magnetizing the transformer cores when a large current flows in their coils and the use of the control source as a passive element whose voltage is measured has resulted in considerable improvement in magnetic amplifier characteristics. The obvious improvement is the simultaneous availability of: short response time, high gain, good linearity, wide output range, virtual independence of supply voltage and good output power/weight ratios.

An understanding of the basic fundamentals of magnetic amplifier operation will admit of many variations of the magnetic amplifier configuration of Figs. 1 and 2 as the theory discussed above enables the prediction of the operation characteristics of any particular amplifier configuration.

Although certain specific embodiments have been shown and described many modifications and variations are possible without departing from the spirit of the present invention. Therefore, this invention is not to be limited except insofar as is necessary by the scope of the disclosure.

What is claimed is:

1. A magnetic amplifier comprising a pair of saturable magnetic cores; a load winding and a control winding wound on each of said cores; a load circuit including said load windings, an alternating-current load voltage source, and first unilateral impedance means for permitting current flow from said load voltage source through alternate load windings in successive half-cycles; and a control circuit including said control windings, an alternating-current voltage source, second unilateral impedance means for permitting current flow from said control voltage source through alternate control windings in successive half-cycles, a constant polarity control voltage source connected in series with said control windings, and means for preventing the flow of current from said constant polarity control voltage source; said unilateral means and said alternating voltage sources having relative polarities such that during each half-cycle current passes through a control winding on one of said cores and a load winding on the other of said cores.

2. A magnetic amplifier comprising first and second saturable magnetic cores, a load winding and a control winding wound on each of said cores, an alternating-current load voltage source coupled to said load windings for applying a voltage thereto to cause said cores to proceed to saturation, unilateral impedance means for limiting the application of said load voltage to alternate load windings in successive half-cycles thereof, unilateral impedance bridge circuit, said control windings being disposed in adjacent arms thereof, an alternating-current demagnetizing voltage source having a frequency and phase substantially equal to that of said load voltage and connected across opposite junctions of said bridge for applying a voltage to said control windings to cause said cores to deviate from saturation, said impedance bridge and unilateral impedance means and said demagnetizing voltage and load voltage sources being poled such that during each half-cycle current passes through a control winding on one of said cores and a load winding on the other of said cores, and a variable control voltage source coupled to said demagnetizing voltage for reducing the value thereof applicable to said control windings.

3. A magnetic amplifier comprising first and second high remanence saturable cores, a load winding on each of said cores, a first load circuit including said first core load winding, a first alternating voltage source having first and second half cycles, a load impedance means, unilateral impedance means coupling said source to said load winding and to said load impedance, said unilateral impedance means poled to provide a unidirectional magnetizing voltage across said load winding during the first half cycles of said source voltage to drive said first core toward saturation, a first control circuit including a control winding, a second alternating voltage source having first and second half cycles and the same phase and frequency as said first source, a variable D.C. control voltage, unilateral means connecting said control winding to said source, said unilateral impedance poled to provide a demagnetizing voltage across said core during the second half cycles of said second source, means coupling said control voltage to said control winding to oppose the demagnetization of said core, a second load circuit including a second core load winding, said first source, and said load impedance, unilateral impedance means coupling said first source to said load winding and said core, said unilateral impedance means poled to provide a magnetizing voltage across said load winding during the second half cycles of said first source, a second control circuit including said control winding of said second core including said second source, said control voltage unilateral impedance means poled to provide a unidirectional demagnetizing voltage across said control winding of said second core during the first half cycles of said source, means connecting said control voltage across said control winding of said second core to oppose the magnetization of said second core.

4. In a full wave magnetic amplifier having successive first and second half cycles of operation, a pair of high remanence saturable cores, means to drive the first core toward saturation during the first half cycles of operation, means to desaturate said first core during said second half cycles, unilateral impedance means connected to said last named means for blocking said means during first half cycles of operation, means to drive said second core toward saturation during said second half cycles, means to desaturate said second core during said first half cycles, and unilateral impedance means connected to said last named means for blocking said means during second half cycles of operation.

5. A full wave magnetic amplifier comprising a pair of high remanence saturable cores each core having a load circuit and a control circuit, said load circuits including a common alternating voltage source having odd and even half cycles, a common load impedance, a load winding on each core, unilateral impedance means connecting said first source to said load and the load winding of said first core during the odd half cycles of said source, said unilateral impedance means poled such that a magnetizing voltage is applied to the load winding of said first core, unilateral impedance means connecting said first source to said load impedance and the load winding of the second core, said unilateral impedance means poled such that a magnetizing voltage is applied across said load winding of said second core during the even half cycles of said source, a control circuit coupled to each core including a common second alternating voltage source having the same phase and frequency as said first named source, a control winding for each control circuit, unilateral impedance means connecting said second source to the control winding of said first core, said unilateral impedance means poled such that a demagnetizing voltage appears across said control winding to demagnetize said first core during the odd half cycles of said source, unilateral impedance means connecting the control winding of said second core to said second source, said unilateral impedance means poled to provide a demagnetizing voltage across said control winding of said second core to demagnetize said second core during the even half cycles of the source, a variable D.C. control voltage common to the control circuits connected to oppose the demagnetizing voltage of the first control winding during the even half cycles to oppose the demagnetizing voltage of the second control winding during the odd half cycles of said second source.

References Cited in the file of this patent

UNITED STATES PATENTS

| | | |
|---|---|---|
| 2,259,647 | Logan | Oct. 21, 1941 |
| 2,554,203 | Morgan | May 22, 1951 |

OTHER REFERENCES

A.I.E.E. Technical Paper 48–222, "Magnetic Amplifiers for Naval Shipboard Applications," by L. W. Buechler, August 1948 (particularly pp. 4, 5 and 6).